US008331387B2

(12) United States Patent
Kwan et al.

(10) Patent No.: US 8,331,387 B2
(45) Date of Patent: Dec. 11, 2012

(54) DATA SWITCHING FLOW CONTROL WITH VIRTUAL OUTPUT QUEUING

(75) Inventors: Bruce Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 382 days.

(21) Appl. No.: 12/144,567

(22) Filed: Jun. 23, 2008

(65) Prior Publication Data

US 2009/0003212 A1  Jan. 1, 2009

Related U.S. Application Data

(60) Provisional application No. 60/945,874, filed on Jun. 22, 2007.

(51) Int. Cl.
*H04L 12/28* (2006.01)
(52) U.S. Cl. .......................... 370/414; 370/237
(58) Field of Classification Search ................... 370/235, 370/416, 418, 414
See application file for complete search history.

(56) References Cited

U.S. PATENT DOCUMENTS

| | | | |
|---|---|---|---|
| 6,657,962 B1 * | 12/2003 | Barri et al. | 370/235 |
| 7,151,744 B2 * | 12/2006 | Sarkinen et al. | 370/230 |
| 7,180,862 B2 * | 2/2007 | Peebles et al. | 370/235 |
| 7,522,624 B2 * | 4/2009 | Barri et al. | 370/413 |
| 7,551,616 B2 * | 6/2009 | Devi et al. | 370/389 |
| 2002/0054568 A1 * | 5/2002 | Hoogenboom et al. | 370/235.1 |

OTHER PUBLICATIONS

"White Paper", A Scalable Approach to Gigabit Ethernet Switch Design, 28 pgs.
"White Paper", Using Stratix GX in Switch Fabric Systems, Altera, 6 pgs.

* cited by examiner

*Primary Examiner* — Mark Rinehart
*Assistant Examiner* — Matthew Hopkins
(74) *Attorney, Agent, or Firm* — Brake Hughes Bellermann LLP

(57) ABSTRACT

Methods and apparatus for data switching are disclosed. An example method includes receiving a data traffic flow at a data ingress module and buffering the data traffic flow in a virtual output queue included in the data ingress module, where the virtual output queue being associated with a data egress module. The example method also includes communicating the data traffic flow to the data egress module via a fabric egress queue included in a data-switch fabric. The example method further includes monitoring data occupancy in the fabric egress queue and determining, based on the data occupancy, that a change in congestion state in the fabric egress queue has occurred. The example method still further includes, in response to the change in congestion state, communicating a flow control message to the data ingress module and, in response to the flow control message, modifying communication of the data traffic flow.

17 Claims, 7 Drawing Sheets

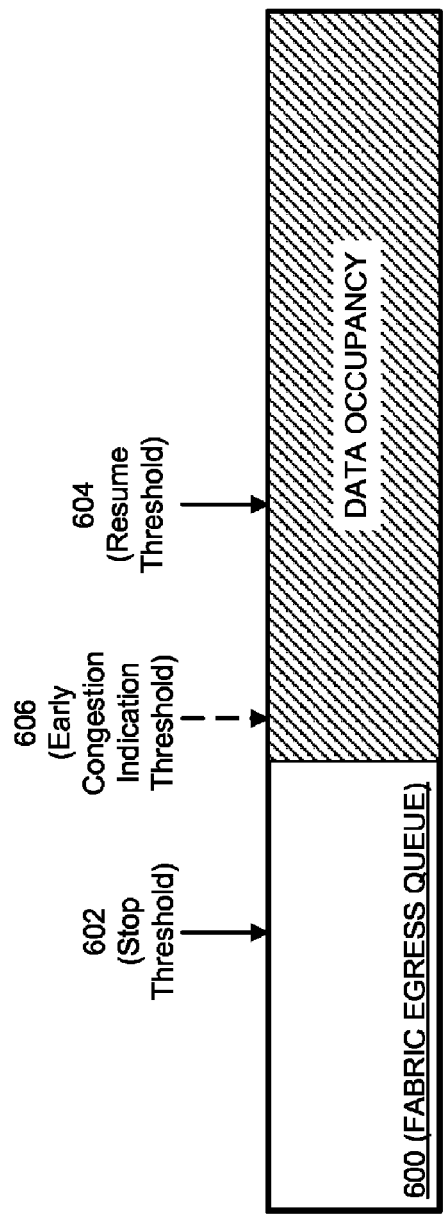

DATA SWITCHING FLOW CONTROL WITH VIRTUAL OUTPUT QUEUING

CROSS-REFERENCE TO RELATED APPLICATIONS

This application claims the benefit under 35 U.S.C. §119 of U.S. Provisional Patent Application No. 60/945,874, filed Jun. 22, 2007. U.S. Provisional Application 60/945,874 is incorporated herein by reference in its entirety.

TECHNICAL FIELD

This description relates to data switches and data-switch fabrics.

BACKGROUND

Networks are used to communicate information, such as packet data, for many different types of applications. Such applications include telecommunications, data networking and storage area networks. In such applications, data switches may be used to route data traffic from multiple inputs to multiple outputs. In data switches fabrics, line cards may be used to receive and transmit data between the multiple inputs and outputs via a data-switch fabric. Such line cards may include one or more data ingress modules and/or one or more data egress modules. For example, a line card may include both an ingress and an egress module.

Using such approaches, data, e.g., packet data, may be routed from ingress modules to egress modules using a data-switch fabric, where each ingress module is operationally coupled with the data-switch fabric using one or more data ingress ports per ingress module. Further, the data-switch fabric is operationally coupled with the egress modules via one or more fabric egress ports per egress module. The data-switch fabric may include one or more fabric elements, or planes.

Such data-switch fabrics may implement data buffer queues that are used to store data while it is being routed through the data-switch fabric from the ingress modules to the egress modules. During periods of heavy data traffic, the data buffer queues in the data-switch fabric may become full, which then results in additional data (e.g., packets) trying to enter the queue being dropped in the data-switch fabric. Such dropping of data may be referred to as "loss" or "fabric-loss."

Flow control mechanisms may be implemented in the data-switch fabric to reduce or prevent such fabric-loss. For instance, service aware flow control may be used to reduce or prevent fabric-loss. In such an approach, if a data queue in the data-switch fabric associated with a specific egress module becomes congested (i.e., an amount of data stored in the queue exceeds a threshold amount) the data-switch fabric or the destination egress module may send a flow control message to the ingress module or ingress modules sending data that is causing the congestion. In systems using service aware flow control (or any coarse-grained, link-level flow control), the associated ingress modules are directed to stop sending data of the specified class of service. In such an approach, other data flows in the same class of service being communicated by the associated ingress modules (that are not contributing to the congestion) are also stopped. Stopping data flows that do not contribute to congestion may be referred to as head-of-line blocking. Such head-of-line blocking is undesirable as it unnecessarily reduces the data transmission efficiency of the data-switch while not measurably contributing to resolution of data congestion in the data-switch fabric.

SUMMARY

Apparatus and methods for data switching using flow control with virtual output queuing are disclosed.

BRIEF DESCRIPTION OF THE DRAWINGS

FIG. 6 is a diagram illustrating an example embodiment of a fabric egress queue.

FIG. 7 is a diagram illustrating an example embodiment of a flow control message.

DETAILED DESCRIPTION

Figure 1:
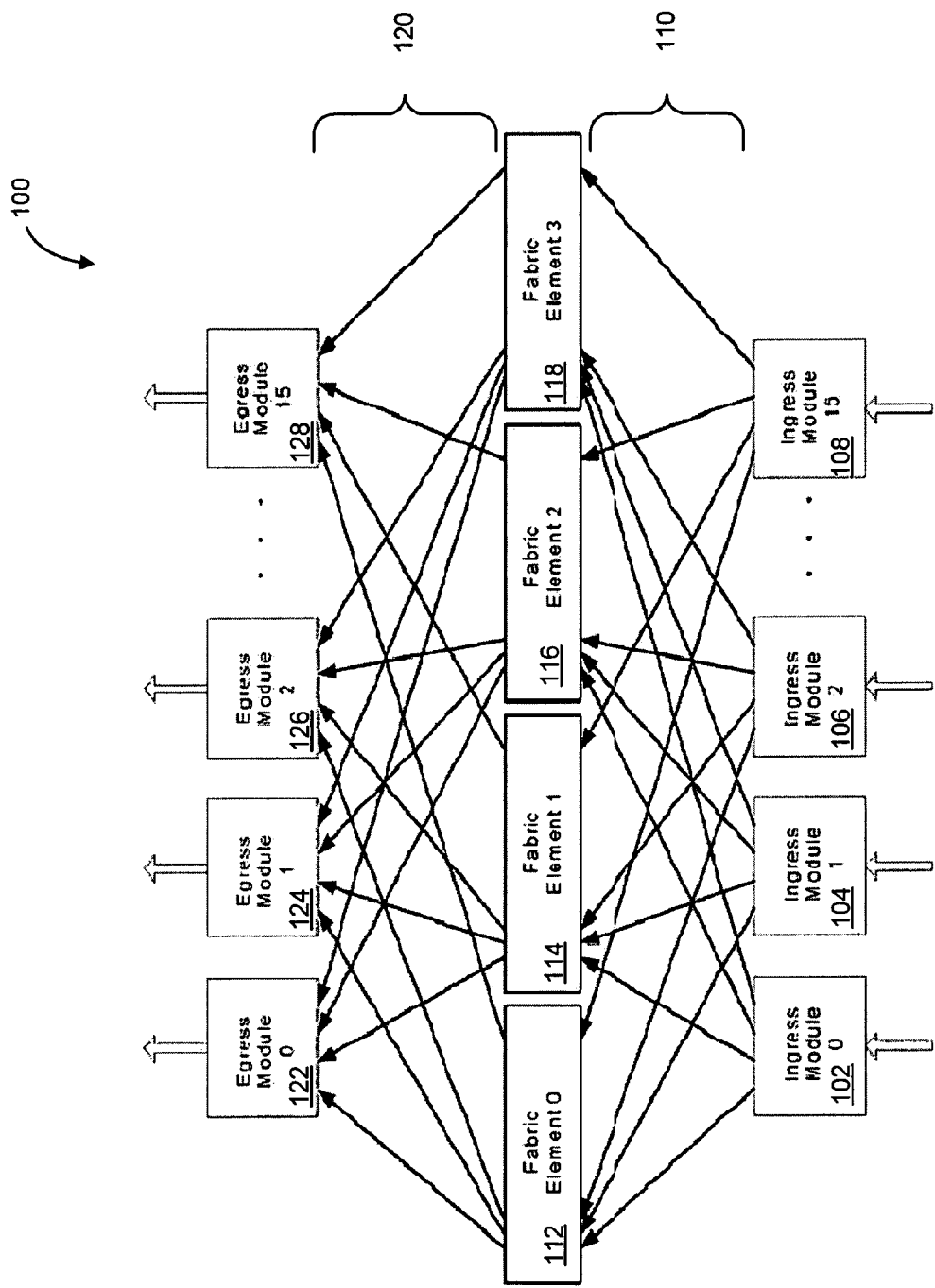
FIG. 1 is a block diagram illustrating an example embodiment of a data-switch fabric.

FIG. 1 is a block diagram illustrating an example embodiment of a data-switch 100 for communication of data between multiple data ingress modules 102, 104, 106 and 108 (Ingress Module 0 . . . . Ingress Module 15) and multiple data egress modules 122, 124, 126 and 128 (Egress Module 0 . . . . Egress Module 15). The data-switch 100 includes a data-switch fabric that includes a plurality of fabric elements 112, 114, 116 and 118 (Fabric Element 0 . . . . Fabric Element 4). The fabric elements 112, 114, 116 and 118 are operationally coupled with the data ingress modules 102, 104, 106 and 106 via a plurality of fabric ingress ports 110. The fabric elements 112, 114, 116 and 118 are also operationally coupled with the data egress modules 122, 124, 126 and 128 via a plurality of fabric egress ports 120.

As illustrated in FIG. 1, each data ingress module is coupled with each fabric element via a single fabric ingress port 110. In other embodiments, the data ingress modules 102, 104, 106 and 108 may be coupled with each fabric element 112, 114, 116 and 118 via multiple fabric ingress ports 110. Likewise in FIG. 1, each data egress module is coupled with each fabric element via a single fabric egress port 120. In other embodiments, the data egress modules 122, 124, 126 and 128 may be coupled with each fabric element 112, 114, 116 and 118 via multiple fabric egress ports 120. Further, in other example embodiments, the data-switch 100 may include additional or fewer ingress modules, egress modules and/or fabric elements.

In FIG. 1, data, e.g., packet data, may be routed from any of the ingress modules 102, 104, 106 and 108 to any of the egress modules 122, 124, 126, and 128 via the fabric ingress ports 110, the fabric elements 112, 114, 116 and 118, and the fabric egress ports 120. As discussed in further detail below, in example embodiments, virtual output queues located in the ingress modules 102, 104, 106 and 108 may be used in conjunction with flow control to prevent loss of data in the fabric elements 112, 114, 116 and 118 (fabric-loss or loss) as well as reduce or prevent head-of-line blocking.

As discussed above, head-of-line blocking (e.g., termination of data flows not contributing to congestion) occurs due to service aware flow control (SAFC) causing, for example, all flows of a particular data traffic class of service from a particular ingress module to be stopped as a result of congestion in a data-switch fabric. Using the techniques described herein, VOQs and flow control may be used to stop transmission (or reduce data rates) only for data flows contributing to congestion, such as for a particular class of service.

Figure 2:
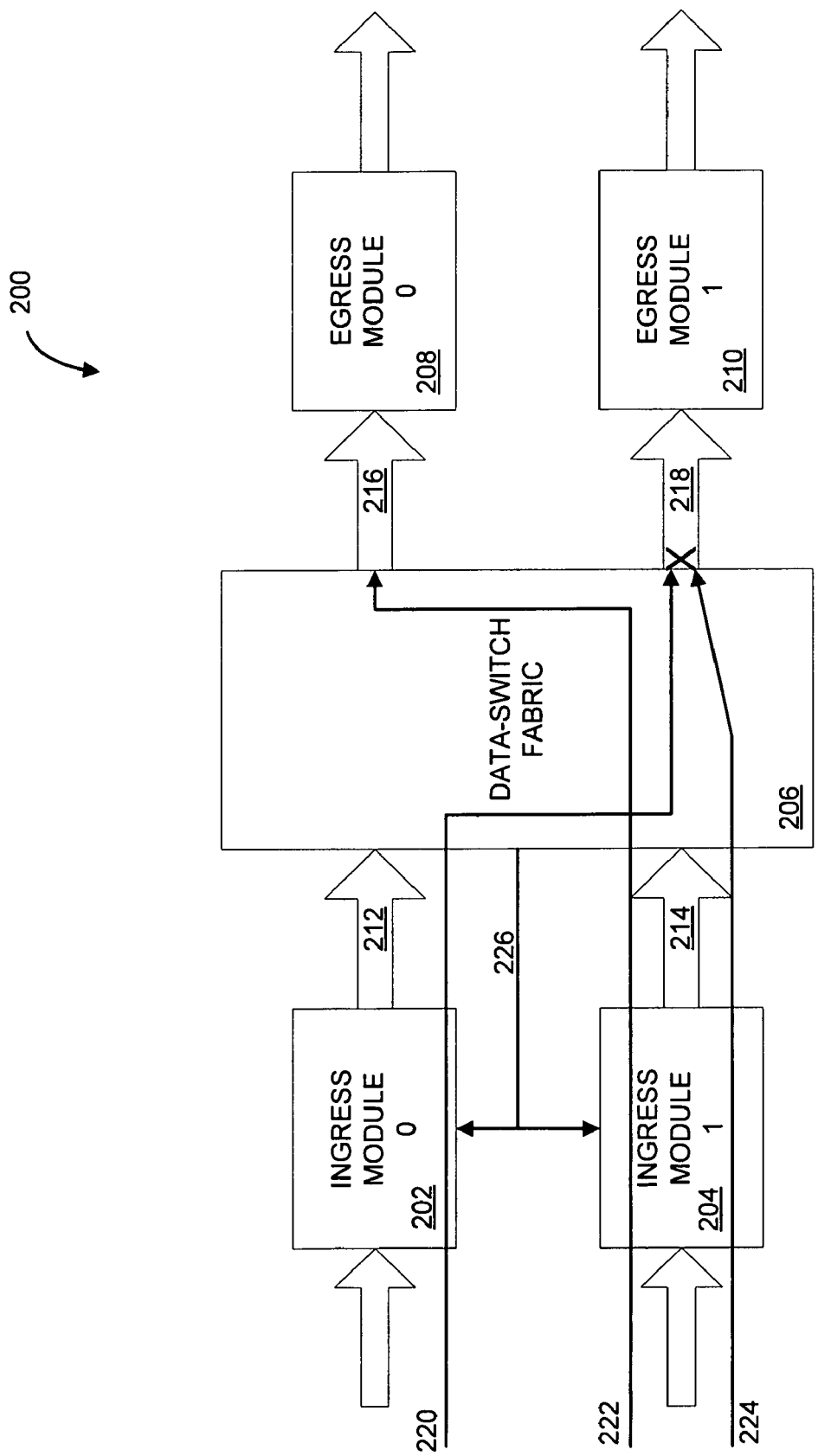
FIG. 2 is a block diagram illustrating an example embodiment of head-of-line blocking in a data-switch fabric.

FIG. 2 is a block diagram illustrating an example embodiment of a data-switch 200 that may be used to reduce or prevent head-of-line blocking. As illustrated in FIG. 2, the data-switch 200 includes ingress module_0 202 and ingress module_1 204. Ingress module_0 202 may be coupled with a data-switch fabric 206 via a fabric ingress port 212. Likewise, ingress module_1 204 may be coupled with the data-switch fabric 206 via a fabric ingress port 214. In other example embodiments, additional fabric ingress ports may be used.

The data-switch fabric 206, which may include one or more fabric elements, may be coupled with an egress module_0 208 via a fabric egress port 216, and also coupled with an egress module_1 210 via a fabric egress port 218. In other example embodiments, the data switch 200 may include additional fabric egress ports. Also, in other example embodiments, additional ingress modules and egress modules may be included.

In the example embodiment of FIG. 2, three data flows 220, 222 and 224 are being communicated in the data-switch 200. In this example, all three data flows are of the same class of service, best effort traffic, for instance. In other embodiments, one or more of the data flows may be associated with other classes of service. Depending on the particular embodiment, any number of classes of service may be used. For instance, in an example embodiment, eight classes of service may be used. In such embodiments, higher classes of service may have higher transmission priority and, accordingly, may be allocated a larger percentage of communication bandwidth in a data-switch (as well as other network elements). For instance, latency sensitive data, such as real-time voice data, may be assigned the highest class of service and have the highest priority for transmission. Best effort traffic, in comparison, is generally not latency sensitive and may be assigned a lower class of service, such as the lowest class of service.

In FIG. 2, data flow 220 is communicated to the egress module_1 210 via the ingress module_0 202, data flow 222 is communicated to the egress module_0 208 via the ingress module_1 204, and data flow 224 is communicated to the egress module_1 210 via the ingress module_1 204. As shown in FIG. 2, the data flows 220 and 224 result in congestion in the data-switch fabric at fabric egress port 218. In response to this congestion, the data-switch fabric may communicate a flow control message to the ingress module_1 204 via a signal line 226. The flow control message may instruct the ingress module_1 201 to stop sending the data flow 224 from a VOQ that is associated with the egress module_1 210. In such an approach, the data flow 220 would continue, which is desirable as the data flow 222 is not contributing to the congestion at fabric egress port 218.

Alternatively, the data-switch fabric 206 may send a flow control message to the ingress module_0 202 in place of, or in addition to the flow control message sent to the ingress module_1 204. The flow control message sent to the ingress module_0 202 may instruct the ingress module_0 202 to stop sending the data flow 220 from a VOQ associated with the egress module_1 210. In another example embodiment, the flow control message may instruct the ingress modules to reduce the rate at which the data flows 220 and 224 are transmitted, which may resolve the congestion at the fabric egress port 218 without the need to stop transmission of the data flows. Because the flow control message is only related to the data flows that are contributing to the congestion (data flows 220 and 224), head-of-line blocking of the data flow 222 is prevented.

Figure 3:
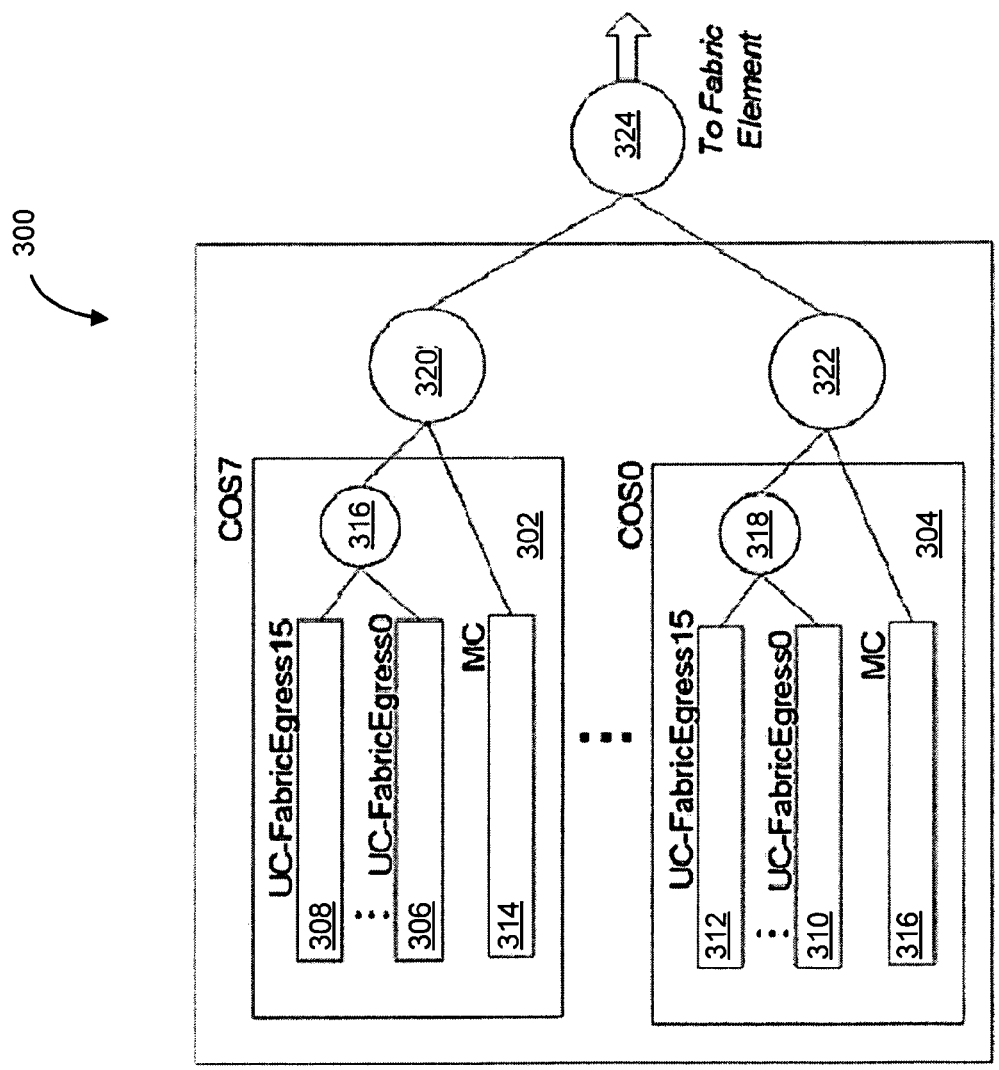
FIG. 3 is a block diagram illustrating an example embodiment of a data ingress module with virtual output queues.

FIG. 3 is a block diagram illustrating an example embodiment of an ingress module 300. The ingress module 300 may be implemented in the data switch 100 illustrated in FIG. 1.

FIG. 3 illustrates sets of VOQs for eight different classes of service (COS) (COS0 to COS7 in this example) for a single fabric ingress port. In FIG. 3, only queues for COS7 (queues 302) and queues for COS0 (queues 304) are shown. In an example embodiment having multiple fabric ingress ports, each fabric ingress port would be serviced by a set of VOQs such as those illustrated in FIG. 3 (queues 302 and 304). The VOQs for each class of service include a set of unicast VOQs corresponding with each data egress module and a multicast VOQ for the respective COS. For instance, for COS7, the ingress module 300 includes a set of sixteen unicast VOQs 306 . . . 308 (UC-FabricEgress0 . . . UC-FabricEgress15), where each VOQ is associated with a respective egress module (e.g., Egress Module 0 . . . . Egress Module 15 in FIG. 1). The COS7 set of VOQs also includes a multicast VOQ 314 for COS7 multicast data.

In the ingress module 300, the COS0 set of VOQs also includes a set of sixteen unicast VOQs 310 . . . 312 (UC-FabricEgress0 . . . UC-FabricEgress15), where each VOQ is associated with a respective egress module (e.g., Egress Module 0 . . . . Egress Module 15 in FIG. 1). The COS0 set of VOQs also includes a multicast VOQ 314 for COS0 multicast data.

When data (e.g., packet data) enters the ingress module 300, the data is placed in a VOQ corresponding with its COS and its destination egress module. The route the data will take through the data-switch fabric, including the fabric egress port, is also determined when the data is placed in a VOQ. As will be discussed in more detail below, the fabric egress queue used to route a particular data packet may correspond with the ingress module that initially receives the packet. In other embodiments, the VOQ used may correspond with the fabric egress port used to communicate the data packet to the corresponding data egress module.

In the ingress module 300, data in the VOQs may be communicated to a data-switch fabric (e.g., fabric element) using a set of distributed schedulers in accordance with a bandwidth allocation policy. For instance, schedulers 316 and 318 may be used to schedule communication of unicast data traffic from the unicast VOQs for their respective COS (e.g., scheduler 316 for COS7 unicast data and scheduler 318 for COS0 unicast data). In such an approach, the schedulers 316 and 318 may be allocated a certain amount of bandwidth according to the bandwidth allocation policy. The schedulers 316 and 318 may then allocate that bandwidth fairly among the unicast VOQs. For instance, in an example embodiment, each unicast VOQ may be given access to an equal amount of bandwidth as every other unicast VOQ for a given COS. Of course, other bandwidth allocations are possible.

For the ingress module 300, schedulers 320 and 322 may be used to schedule unicast and multicast data for respective COSs. As with the schedulers 316 and 318, a certain amount of bandwidth may be allocated to the schedulers 320 and 322, which is then shared between unicast data and multicast data for each COS in accordance with the bandwidth allocation policy. The bandwidth allocated to the schedulers 320 and 322 may be shared between unicast and multicast data on a weighted basis. For example, unicast data may receive twice as much bandwidth allocation as multicast data. The exact bandwidth allocation depends on the particular embodiment and any number of bandwidth allocation approaches may be used.

Further in the ingress module 300, a scheduler 324 may be used to allocate bandwidth between the different COSs. In this example, because COS7 has a higher transmission priority than COS0, COS7 data traffic may be allocated a larger percentage of the bandwidth available to the scheduler 324.

It will be appreciated that the distributed scheduling described above is given by way of example and any number of other scheduling approaches may be used. For instance, scheduling for a given class of service may be implemented using a single scheduler to schedule both unicast and multicast data instead of using two separate schedulers, as illustrated in FIG. 3. The schedulers 316, 318, 320, 322 and 324 may allocate their available bandwidth using any number of scheduling techniques, such as, for example, weighted deficit round robin scheduling, though any appropriate approach may be used.

Figure 4:
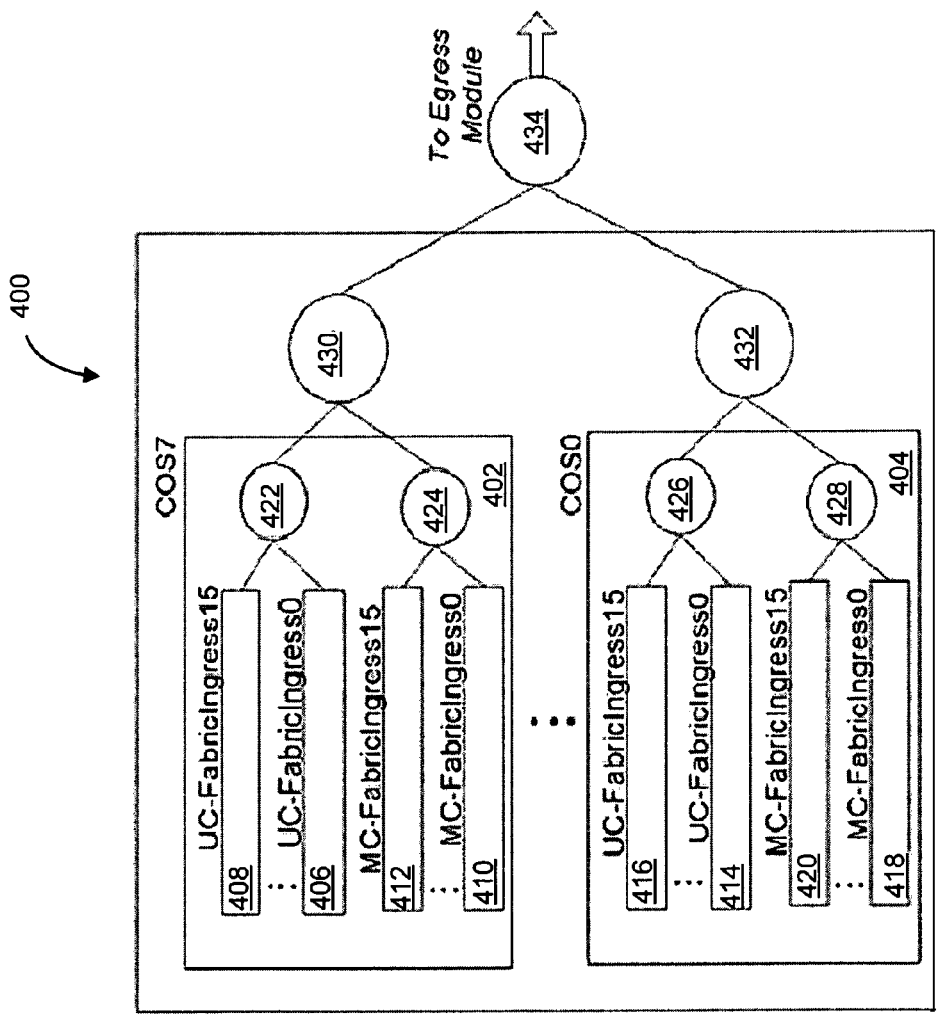
FIG. 4 is a block diagram illustrating an example embodiment of a data-switch fabric element.

FIG. 4 is a block diagram illustrating an example embodiment of a fabric element 400. The fabric element 400 may be implemented in the data switch 100 as any of the fabric elements 112, 114, 116 and 118.

FIG. 4 illustrates sets of fabric egress queues for eight different classes of service (COS0 to COS7 in this example) for a single fabric egress port. In FIG. 4, only queues for COS7 (queues 402) and queues for COS0 (queues 404) are shown. In an example embodiment having multiple fabric egress ports, each fabric egress port would be serviced by a set of fabric egress queues such as those illustrated in FIG. 4 (queues 402 and 404). The fabric egress queues for each class of service include a set of unicast fabric egress queues corresponding with each data ingress module and a set of multicast fabric egress queues also corresponding with each data ingress module.

For instance, for the COS7 queues 402, the fabric element 400 includes a set of sixteen unicast fabric egress queues 406 . . . 408 (UC-FabricIngress0 . . . UC-FabricIngress15), where each unicast fabric egress queue is associated with a respective ingress module (e.g., Ingress Module 0 . . . . Ingress Module 15 in FIG. 1). The COS7 set of fabric egress queues 402 also includes a set of sixteen multicast fabric egress queues 410 . . . 412 (MC-FabricIngress0 . . . MC-FabricIngress15), where each multicast fabric egress queue is associated with a respective ingress module (e.g., Ingress Module 0 . . . . Ingress Module 15 in FIG. 1).

In the fabric element 400, the COS0 set of fabric egress queues 404 also includes a set of sixteen unicast fabric egress queues 414 . . . 416 (UC-FabricIngress0 . . . UC-FabricIngress15), where each unicast fabric egress queue is associated with a respective ingress module (e.g., Ingress Module 0 . . . . Ingress Module 15 in FIG. 1). The COS0 set of fabric egress queues 404 also includes a set of sixteen multicast fabric egress queues 418 . . . 420 (MC-FabricIngress0 . . . MC-FabricIngress15), where each multicast fabric egress queue is associated with a respective ingress module (e.g., Ingress Module 0 . . . . Ingress Module 15 in FIG. 1).

In the fabric element 400, data in the fabric egress queues may be communicated to an associated egress module using a set of distributed schedulers in accordance with a bandwidth allocation policy. For instance, schedulers 422 and 426 may be used to schedule communication of unicast data traffic from the unicast fabric egress queues for their respective COS (e.g., scheduler 422 for COS7 unicast data and scheduler 426 for COS0 unicast data). In such an approach, the schedulers 422 and 426 may be allocated a certain amount of bandwidth according to the bandwidth allocation policy. The schedulers 422 and 426 may then allocate that bandwidth fairly among the unicast fabric egress queues. For instance, in an example embodiment, each unicast fabric egress queue may be given access to an equal amount of bandwidth as every other unicast fabric egress queue for a given COS. Of course, other bandwidth allocations are possible.

Also in the fabric element 400, schedulers 424 and 428 may be used to schedule multicast data traffic from the multicast fabric egress queues for their respective COS (e.g., scheduler 424 for COS7 multicast data and scheduler 428 for COS0 multicast data). In such an approach, the schedulers 424 and 428 may be allocated a certain amount of bandwidth according to the bandwidth allocation policy. The schedulers 424 and 428 may then allocate that bandwidth fairly among the multicast fabric egress queues. For instance, in an example embodiment, each multicast fabric egress queue may be given access to an equal amount of bandwidth as every other multicast fabric egress queue for a given COS. Of course, other bandwidth allocations are possible.

For the fabric element 400, schedulers 430 and 432 may be used to schedule unicast and multicast data for respective COSs. As with the schedulers 422, 424, 426 and 428, a certain amount of bandwidth may be allocated to the schedulers 430 and 432, which is then shared between unicast data and multicast data for each COS in accordance with the bandwidth allocation policy. The exact bandwidth allocation depends on the particular embodiment and any number of bandwidth allocation approaches may be used.

Further in the fabric element 400, a scheduler 434 may be used to allocate bandwidth between the different COSs. In this example, because COS7 has a higher transmission priority than COS0, COS7 data traffic may be allocated a larger percentage of the bandwidth available to the scheduler 434.

As was discussed with respect to FIG. 3, it will be appreciated that the distributed scheduling described above for the fabric element 400 is given by way of example and any number of other scheduling approaches may be used. For instance, scheduling for a given class of service may be implemented using a single scheduler to schedule both unicast and multicast data instead of using two separate schedulers, as illustrated in FIG. 4. The schedulers 422-434 may allocate their available bandwidth using any number of scheduling techniques, such as, for example, weighted deficit round robin scheduling, though any appropriate approach may be used.

Figure 5:
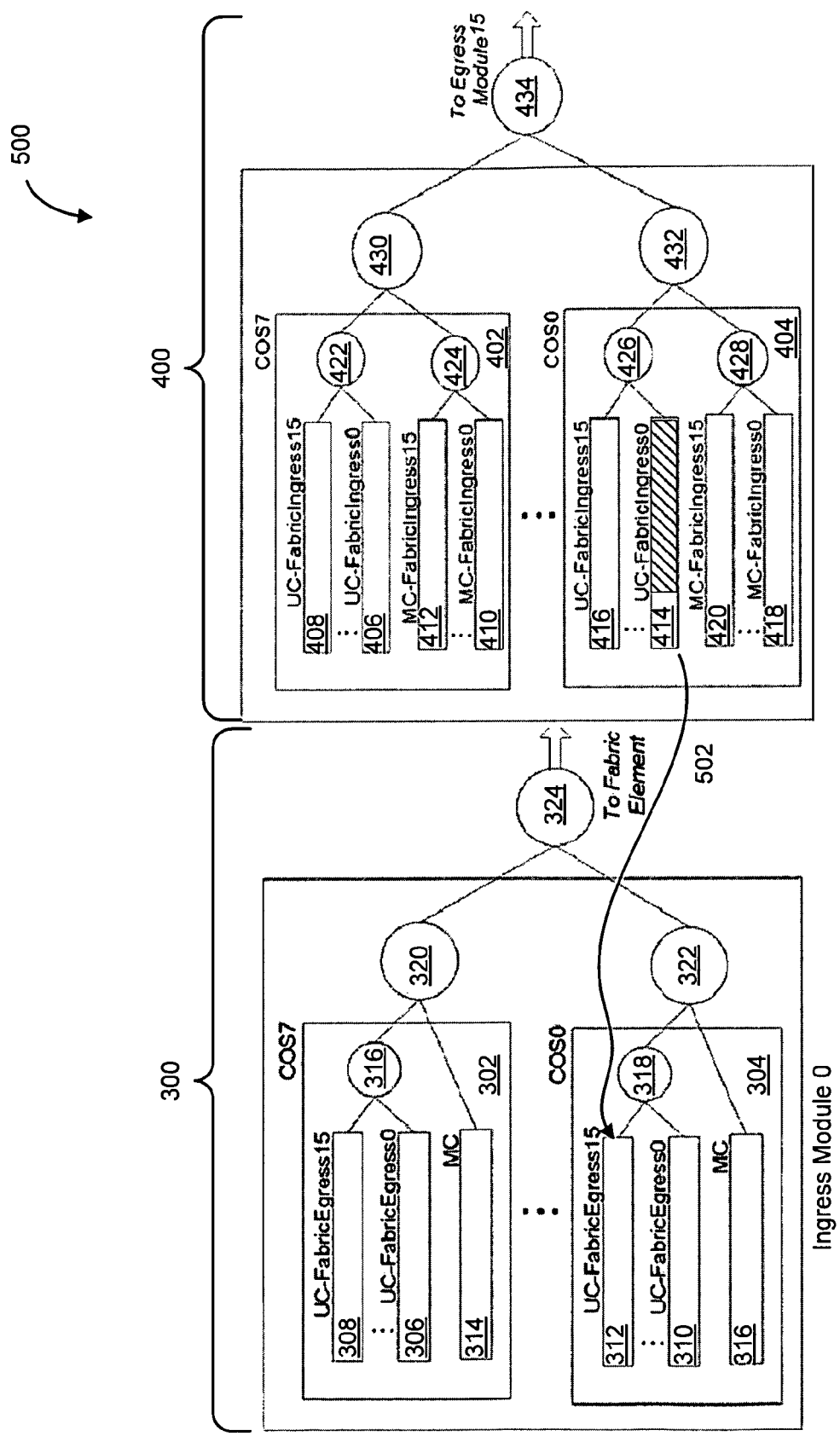
FIG. 5 is a block diagram illustrating an example embodiment of flow control for resolving head-of-line blocking.

FIG. 5 is a block diagram illustrating an example embodiment of a data switch 500 that illustrates flow control signaling using VOQs. The data switch 500 includes the ingress module 300 illustrated in FIG. 3 and the fabric element 400 illustrated in FIG. 4. The reference numbers for the ingress module 300 and the fabric element 400 are the same as previously discussed. For purposes of brevity and clarity, the details of the ingress module 300 and the fabric element 400 will not be repeated again with reference to FIG. 5.

When data (e.g., packet data) enters the fabric element 400, the data is placed in a fabric egress queue that is determined by its COS, whether it is unicast or multicast, and its originating ingress module. In other embodiments, the fabric egress queue used may correspond with the fabric ingress port used to communicate the data packet to the data-switch fabric rather than the ingress module.

FIG. 5 illustrates an example of flow control in the data switch 500 using VOQs implemented in the ingress module 300, which, in this example, may be ingress module_0 102 of FIG. 1. In the data switch 500, a data flow may enter the ingress module 300. Upon receiving the data flow, the ingress module 300 may determine that the data flow is a COS0, unicast data flow and may also determine that the data flow is to be communicated to a specific egress module (e.g., egress module_15 128 of FIG. 1). A route (e.g., fabric ingress port and fabric egress port) through the data switch 500 may also be determined when the data flow is received at the ingress module 300. The ingress module 300 may then place packets associated with the data flow in the unicast VOQ 312 of the ingress module 300, which is associated with the destination egress module for the data flow (e.g., egress module_15 128 of FIG. 1). Packets of the data flow may then be communicated to the fabric element 400, for example, using the scheduling mechanisms discussed above with respect to FIG. 3.

Upon receiving the packets of the data flow from the ingress module, the fabric element 400 may buffer the packets in unicast fabric egress queue 414, which is associated with the ingress module 300. The packets in the fabric egress queue 414 may be communicated to the destination egress module using the scheduling mechanisms discussed above with respect FIG. 4.

If the fabric egress queue 414 becomes congested, as indicated by the cross-hatched area indicating data occupancy, the fabric element 400 may communicate a flow control message to the ingress module 300 indicating that the data flow being communicated from VOQ 312 is causing congestion in the fabric egress queue 414. In response to the flow control message, the ingress module (e.g., using the scheduler 318) may stop or slow transmission of the data flow from the VOQ 312. Once the data congestion is relieved (e.g., data occupancy in the fabric egress queue 414 falls below a certain level), the fabric element 400 may send another flow control message to the ingress module 300 indicating that communication of data traffic from VOQ 312 may be resumed at its normally allocated bandwidth.

FIG. 6 is a diagram illustrating an example embodiment of a fabric egress queue 600. FIG. 6 illustrates examples of flow control signaling thresholds that may be used in conjunction in conjunction with the example flow control signaling techniques described herein. In FIG. 6, three data occupancy thresholds 602, 604 and 606 are illustrated. In one example embodiment, the thresholds 602 and 604 may be used and, in another example embodiment, all three thresholds 602, 602, 606 may be used.

In the data queue 600, the cross-hatched area represents a data occupancy of the queue 600, or how much data is buffered in the queue 600. In the data queue 600, as illustrated in FIG. 6, the data occupancy is greater than the thresholds 604 and 606 and less than the threshold 602.

In an example embodiment that uses only the thresholds 602 and 604, the threshold 602 may be used to indicate congestion in the data queue 600. In this example, when the data occupancy of the queue 600 exceeds the threshold 602, the data-switch fabric may send a flow control message instructing one or more ingress modules to stop sending data flows from VOQs that are causing the congestion. In this example, the threshold 604 may be used as a resume threshold. For instance, if the data occupancy exceeds the threshold 602 causing one or more flows to be stopped, once the data occupancy in the queue 600 falls below the threshold 604, the data-switch fabric may send another flow control message to instruct the ingress module(s) to resume sending data from the VOQ(s) that were previously stopped.

In an example embodiment that uses all three thresholds 602, 604 and 606, the thresholds 602 and 604 may be used in the same fashion as discussed above. The threshold 606 may be used as an early indication of congestion. In such an approach, if the data occupancy of the queue 600 exceeds the threshold 606 but not the threshold 602 (as illustrated in FIG. 6), the data switch-fabric may send a flow control message instructing one or more ingress modules to reduce the transmission rate of data flows from VOQs that are causing the congestion. If congestion continues to build and the data occupancy exceeds the threshold 602, another flow control message may be sent instructing the respective ingress module(s) to stop sending the data flow(s) causing the congestion. Once the data occupancy of the queue 600 falls below the threshold 604, yet another flow control message may be sent instructing the ingress module(s) to resume sending data from the VOQs that were previously slowed and/or stopped.

FIG. 7 is a diagram illustrating an example embodiment of a flow control message 700. The flow control message 700 may be used to instruct an ingress module to slow, stop or resume sending a data flow from a specific VOQ included in the ingress module. The flow control message 700 includes a congestion state indicator 702. The congestion state indicator 702 may include values corresponding with data occupancy thresholds. For instance, referring to the example data queue 600 in FIG. 6, the congestion state indicator 702 may indicate that a data flow is to be slowed, stopped or resumed, in embodiments where all three thresholds (602, 604 and 606) are used. In another example embodiment, the congestion state indicator 702 may indicate that a data flow is to be stopped or resumed, in the situation where two thresholds (602 and 604) are used.

The flow control message 700 also includes a unicast/multicast indicator 704 to indicate whether the congestion is associated with unicast data or multicast data. The unicast/multicast indicator 704 may be used by the ingress module to identify the particular VOQ that is causing congestion, or was causing congestion and is to resume sending data (e.g., whether the congestion is resulting, or resulted from transmission of unicast data or multicast data). The control message 700 may also include a class of service indication 706. The class of service indication 706 may be used by the ingress module to determine which set of class of service VOQs contain the VOQ that is causing, or was causing congestion. The flow control message 700 may further include a destination egress module indicator 708.

Using the unicast/multicast indictor 704, the class of service indicator 706 and the destination egress module indicator 708, an ingress module can identify an individual VOQ from which a data flow is being transmitted. Using the congestion state indicator 702, the ingress module can determine if the data flow is to be slowed, stopped or resumed.

Figure 8:
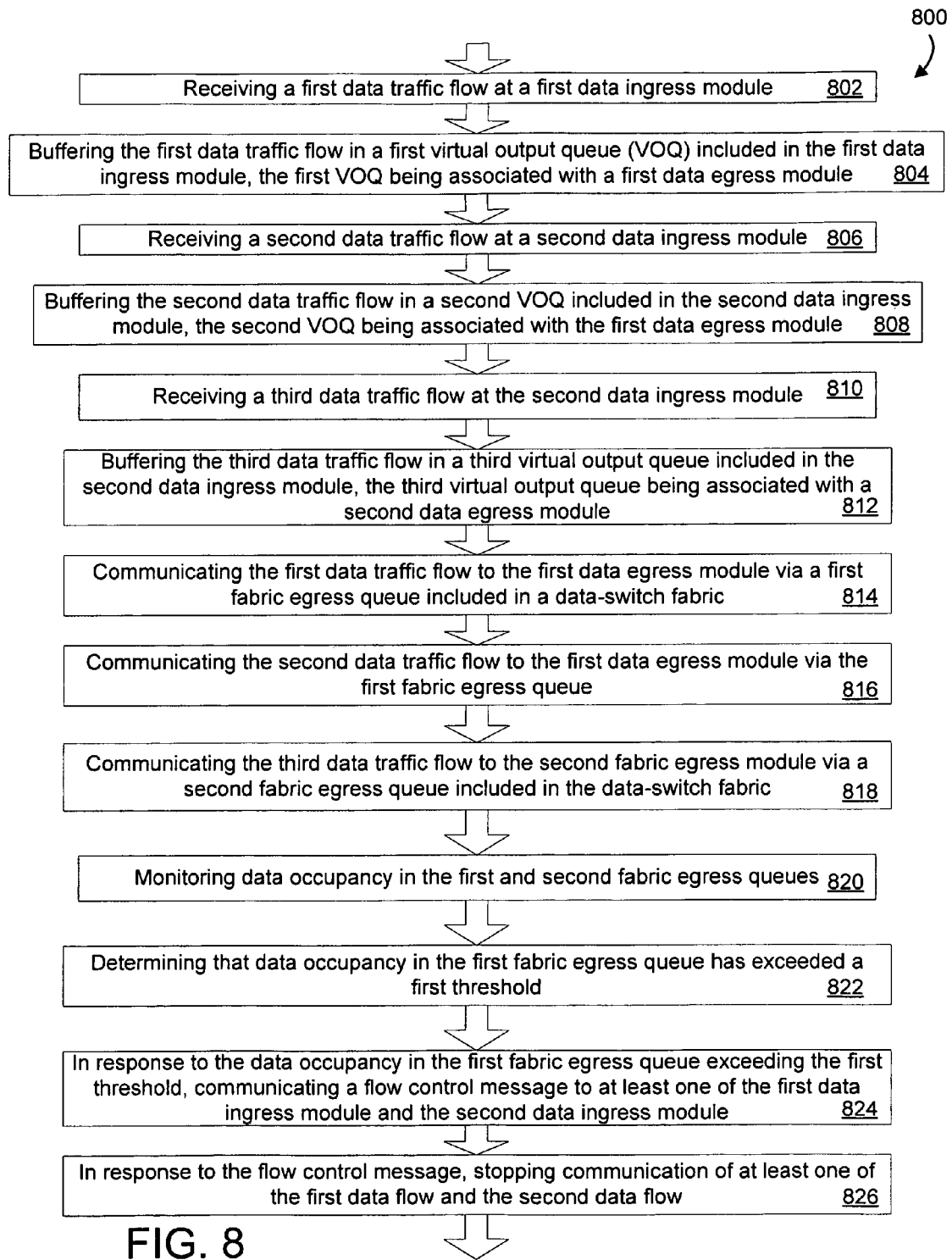
FIG. 8 is a flowchart illustrating an example method of flow control.

FIG. 8 is a flowchart illustrating an example embodiment of a method 800 for data communication in a data switch. The method 800 may be implemented using the example data switch embodiments that have been described herein. For instance, the method 800 may be implemented in the example data switch 200 illustrated in FIG. 2.

At block 802, the method 800 includes receiving a first data traffic flow at a first data ingress module. At block 804, the first data traffic flow may be buffered in a first virtual output queue included in the first data ingress module, where the first virtual output queue is associated with a first data egress module. At block 806, the method 800 may include receiving a second data traffic flow at a second data ingress module. At block 808, the method 800 may include buffering the second data traffic flow in a second virtual output queue included in the second data ingress module, where the second virtual output queue is associated with the first data egress module. Further in the method 800, at block 810, the method 800 may include receiving a third data traffic flow at the second data ingress module. At block 812, the method 800 may include buffering the third data traffic flow in a third virtual output queue included in the second data ingress module, where the third virtual output queue is associated with a second data egress module.

The method 800 may further include, at block 814, communicating the first data traffic flow to the first data egress module via a first fabric egress queue included in a data-switch fabric. At block 816, the method 800 may include communicating the second data traffic flow to the first data egress module via the first fabric egress queue. At block 818, the method 800 may include communicating the third data traffic flow to the second fabric egress module via a second fabric egress queue included in the data-switch fabric.

At block 820, the method 800 includes monitoring data occupancy in the first and second fabric egress queues. At block 822, the method 800 includes determining that data occupancy in the first fabric egress queue has exceeded a first threshold. In response to the data occupancy in the first fabric egress queue exceeding the first threshold, at block 824, the method 800 includes communicating a flow control message to at least one of the first data ingress module and the second data ingress module.

The method 800 further includes, at block 826, in response to the flow control message, stopping communication of at least one of the first data flow and the second data flow. As was previously described, the method 800 may further include sending another flow control message instructing the ingress module(s) to resume sending data from the VOQs associated with the stopped data flows once data occupancy in the first fabric egress queue drops below a resume threshold (such as the resume threshold 604 illustrated and described above with respect to FIG. 6). In other example embodiments, the flow control message sent at block 824 may instruct the ingress module(s) to reduce transmission rates, rather than stopping data flows contributing to congestion in the first fabric egress queue.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An apparatus comprising:
a plurality of data egress modules;
a data-switch fabric operationally coupled with the plurality of data egress modules; and
a plurality of data ingress modules operationally coupled with the data-switch fabric, each of the plurality of data ingress modules comprising a set of virtual output queues, each set of virtual output queues comprising:
a set of unicast virtual output queues including a respective unicast virtual output queue corresponding with each of the plurality of data egress modules; and
a multicast virtual output queue,
wherein the data-switch fabric is configured to:
determine a change in a congestion state for one or more fabric egress queues included in the data-switch fabric; and
send a flow control message to a given data ingress module corresponding with the change in congestion state, the flow control message including an indication whether data in at least one of the unicast virtual output queues of the given data ingress module or data in the multicast virtual output queue of the given data ingress module is associated with the change in congestion state, and wherein the data ingress modules are configured to receive and route data traffic to the respective data egress modules via the virtual output queues and the data-switch fabric in accordance with the flow control message.

2. The apparatus of claim 1, wherein the data-switch fabric comprises:
a plurality of fabric ingress ports configured to receive data from the plurality of ingress modules; and
a plurality of fabric egress ports configured to communicate data to the plurality of data egress modules, each of the plurality of fabric egress ports including a set of fabric egress queues, each set of fabric egress queues being respectively associated with one of the data egress modules, each fabric egress queue corresponding with a respective data ingress module.

3. The apparatus of claim 2, wherein each set of fabric egress queues includes a unicast data queue and a multicast data queue.

4. The apparatus of claim 2, wherein each set of fabric egress queues includes multiple sets of fabric egress queues, each of the multiple sets being associated with a respective data traffic class of service.

5. The apparatus of claim 2, wherein data is directly queued in the fabric egress queues when received at the data-switch fabric.

6. The apparatus of claim 1, wherein the data-switch fabric comprises a plurality of fabric elements, each of the fabric elements being operationally coupled with each of the data egress modules via one or more respective fabric egress ports and operationally coupled with each of the data ingress modules via one or more respective fabric ingress ports.

7. The apparatus of claim 1, wherein each data ingress module includes a plurality of sets of virtual output queues associated with each data egress module, each set of virtual output queues corresponding with a data traffic class of service.

8. The apparatus of claim 7, wherein each data ingress module further comprises:
for each set of virtual output queues:
a first scheduler configured to schedule transmission of unicast data from the unicast virtual output queues in accordance with a bandwidth allocation policy; and
a second scheduler configured to schedule transmission of the unicast data and multicast data in accordance with the bandwidth allocation policy; and
a third scheduler configured to schedule transmission of data for each data traffic class of service in accordance with the bandwidth allocation policy.

9. The apparatus of claim 1, wherein the apparatus further comprises:
a first scheduler configured to schedule transmission of unicast data from the unicast virtual output queues in accordance with a bandwidth allocation policy; and
a second scheduler configured to schedule transmission of the unicast data and multicast data in accordance with the bandwidth allocation policy.

10. The apparatus of claim 1, wherein the flow control message further includes at least one of:
an indication of the change in congestion state;
an indication of a data traffic class of service associated with the change in congestion state; and
an identifier of a data egress module destination of the data-switch fabric associated with the change in congestion state.

11. The apparatus of claim 1, wherein, in response to the flow control message, the data ingress modules are configured to:
in the event the flow control message indicates that data occupancy in a fabric egress queue has exceeded a first threshold, stop communicating data from a virtual output queue associated with the change in congestion state; and
in the event the flow control message indicates that data occupancy in a previously congested fabric egress queue has been reduced below a second threshold, resume communicating data from a virtual output queue associated with the change in congestion state.

12. The apparatus of claim 1, wherein, in response to the flow control message, the data ingress modules are configured to:
in the event the flow control message indicates that data occupancy in a fabric egress queue has exceeded a first threshold, reduce a data rate for data communicated from a virtual output queue associated with the change in congestion state;
in the event the flow control message indicates that data occupancy in a fabric egress queue has exceeded a second threshold, stop communicating data from a virtual output queue associated with the change in congestion state; and
in the event the flow control message indicates that the data occupancy in a previously congested fabric egress queue has been reduced below a third threshold, resume communicating data from a virtual output queue associated with the change in congestion state at a normal data rate.

13. A method comprising:
receiving a plurality of data traffic flows at a data ingress module;
buffering the plurality of data traffic flows in a set of virtual output queues included in the data ingress module, the set of virtual output queues comprising:
a set of unicast virtual output queues including a respective unicast virtual output queue corresponding with each of a plurality of data egress modules; and
a multicast virtual output queue;
communicating the plurality of data traffic flows to respective data egress modules of the plurality of data egress module via respective fabric egress queues included in a data-switch fabric, wherein the respective fabric egress queues are each associated with the data ingress module;
monitoring data occupancy in the fabric egress queues;
determining, based on data occupancy of the fabric egress queues, that a change in congestion state in one or more of the fabric egress queues has occurred;
in response to the change in congestion state, communicating a flow control message to the data ingress module, the flow control message including an indication whether data in at least one of the unicast virtual output queues or data in the multicast virtual output queue is associated with the change in congestion state; and
in response to the flow control message, modifying communication of one or more of the plurality of data traffic flows.

14. The method of claim 13, wherein data of the plurality of data traffic flows is directly queued in the respective fabric egress queues when received at the data-switch fabric.

15. The method of claim 13, wherein:

determining the change in congestion state comprises determining that the data occupancy in one or more of the fabric egress queues has exceeded a first threshold; and modifying communication of the one or more of the plurality of data traffic flows comprises stopping communication of the one or more of the plurality of data traffic flows.

16. The method of claim 15, wherein:

determining the change in congestion state comprises determining that the data occupancy in one or more of the fabric egress queues has fallen below a second threshold, the second threshold being lower than the first threshold; and modifying communication of the one or more of the plurality of data traffic flows comprises resuming communication of the one or more of the plurality of data traffic flows.

17. The method of claim 13, wherein the flow control message further includes:

an indication of the change in congestion state; and an indication of a destination egress module corresponding with the change in congestion state.

* * * * *